(12) United States Patent
Jeong et al.

(10) Patent No.: US 10,471,601 B2
(45) Date of Patent: Nov. 12, 2019

(54) APPARATUS AND METHOD OF CONTROLLING ROBOT ARM

(71) Applicant: HANWHA PRECISION MACHINERY CO., LTD., Changwon-do (KR)

(72) Inventors: Jae Ho Jeong, Changwon-si (KR); Young Dong Cha, Changwon-si (KR)

(73) Assignee: HANWHA PRECISION MACHINERY CO., LTD., Changwon-si (KR)

( * ) Notice: Subject to any disclaimer, the term of this patent is extended or adjusted under 35 U.S.C. 154(b) by 230 days.

(21) Appl. No.: 15/603,559

(22) Filed: May 24, 2017

(65) Prior Publication Data

US 2018/0154523 A1 Jun. 7, 2018

(30) Foreign Application Priority Data

Dec. 7, 2016 (KR) .................. 10-2016-0166211

(51) Int. Cl.
*B25J 9/10* (2006.01)
*B25J 9/16* (2006.01)
(Continued)

(52) U.S. Cl.
CPC .......... *B25J 9/1692* (2013.01); *B25J 9/1674* (2013.01); *B25J 13/089* (2013.01); *B25J 19/021* (2013.01);
(Continued)

(58) Field of Classification Search
CPC ...... B25J 9/1692; B25J 13/089; B25J 19/021; B23P 19/10; A61B 2017/00725;
(Continued)

(56) References Cited

U.S. PATENT DOCUMENTS 8,948,917 B2 * 2/2015 Massey ............... B23K 9/16
700/259
9,156,162 B2 * 10/2015 Suzuki ................... B25J 9/16
(Continued)

FOREIGN PATENT DOCUMENTS

JP 10-34571 A 2/1998
JP 2007-152470 A 6/2007
(Continued)

OTHER PUBLICATIONS

Communication dated Feb. 14, 2018, issued by the Korean Intellectual Property Office in counterpart Korean application No. 10-2016-00166211.

*Primary Examiner* — Dalena Tran
(74) *Attorney, Agent, or Firm* — Sughrue Mion, PLLC

(57) ABSTRACT

An apparatus for controlling a robot arm includes: the robot arm; a calibration board on which calibration marks for self-diagnosis are shown; a distance sensor mounted on the robot arm and configured to measure a distance; an image sensor mounted on the robot arm and configured to obtain an image; and a processor configured to move the robot arm to a position for the self-diagnosis, measure a distance from a predetermined part of the robot arm to the calibration board by using the distance sensor, obtain an image of the calibration board by using the image sensor, and output a signal indicating a malfunction of the robot arm in response to the measured distance being outside a distance error range, and an image measurement value of the obtained image being outside an image error range.

17 Claims, 5 Drawing Sheets

(51) Int. Cl.
 *B25J 19/02* (2006.01)
 *B25J 13/08* (2006.01)
(52) U.S. Cl.
 CPC .............. *G05B 2219/39045* (2013.01); *G05B 2219/39046* (2013.01); *G05B 2219/39413* (2013.01)
(58) Field of Classification Search
 CPC ........... G05B 2219/39045; G05B 2219/39413; G05B 2219/39016; G05B 2219/40613
 USPC .......... 700/245, 259, 254, 258; 901/8, 9, 14; 382/103, 151, 153
 See application file for complete search history.

(56) References Cited

U.S. PATENT DOCUMENTS

| | | | |
|---|---|---|---|
| 9,199,379 B2 * | 12/2015 | Namiki | ................. B25J 9/1697 |
| 2008/0097646 A1 | 4/2008 | Ramsey et al. | |
| 2015/0209962 A1 | 7/2015 | Hong et al. | |
| 2016/0114486 A1 | 4/2016 | Huang et al. | |

FOREIGN PATENT DOCUMENTS

| | | | |
|---|---|---|---|
| JP | 2010-507498 A | 3/2010 | |
| JP | 2011-177845 A | 9/2011 | |
| KR | 10-1408657 B1 | 6/2014 | |

\* cited by examiner

APPARATUS AND METHOD OF CONTROLLING ROBOT ARM

CROSS-REFERENCE TO THE RELATED APPLICATION

This application claims priority from Korean Patent Application No. 10-2016-0166211, filed on Dec. 7, 2016, in the Korean Intellectual Property Office, the disclosure of which is incorporated herein in its entirety by reference.

BACKGROUND

1. Field

Apparatuses and methods consistent with exemplary embodiments of the inventive concept relate to controlling a robot arm.

2. Description of the Related Art

A robot may perform a pick-and-place function by controlling a motion of its arm.

However, when a motion of the robot is not accurately controlled or the robot arm is misaligned as the pick-and-place function is repeatedly performed, a work accuracy decreases, thereby leading to uneconomical performance.

Accordingly, self-diagnosis for determining whether the robot arm is misaligned is needed.

SUMMARY

One or more exemplary embodiments are based on a technology for accurately controlling a robot arm.

Various aspects of the inventive concept will be set forth in part in the description which follows and, in part, will be apparent from the description, or may be learned by practice of the presented exemplary embodiments.

According to one or more exemplary embodiments, there is provided an apparatus for controlling a robot arm includes: the robot arm; a calibration board on which calibration marks for self-diagnosis are shown; a distance sensor mounted on the robot arm and configured to measure a distance; an image sensor mounted on the robot arm and configured to obtain an image; and a processor configured to move the robot arm to a position for the self-diagnosis, measure a distance from a predetermined part of the robot arm to the calibration board by using the distance sensor, obtain an image of the calibration board by using the image sensor, and output a signal indicating a malfunction of the robot arm in response to the measured distance being outside a distance error range, and an image measurement value of the obtained image being outside an image error range.

The processor may be further configured to output a malfunction of the distance sensor in response to the measured distance being outside the distance error range, and the image measurement value of the obtained image being within the image error range.

The processor may be further configured to correct the malfunction of the distance sensor.

The processor may be further configured to output a signal indicating a malfunction of the image sensor in response to the measured distance being within the distance error range, and the image measurement value of the obtained image being outside the image error range.

The processor may be further configured to set at least one of a reference distance and a reference image measurement value, wherein the distance error range is an error range of the reference distance and the image error range is an error range of the reference image measurement value.

The image measurement value may include at least one of a resolution, a sharpness, and a central position of the obtained image, wherein the processor is further configured to output a vertical malfunction of the robot arm in response to at least one of the resolution and the sharpness of the obtained image is substantially different from the reference image measurement value, and output a horizontal malfunction of the robot arm in response to the central position of the obtained image is substantially different from the reference image measurement value.

The processor may be further configured to output a malfunction of the distance sensor in response to the distance from the predetermined part of the robot arm to the calibration board not being measured by using the distance sensor.

According to one or more exemplary embodiments, there is provided an apparatus for controlling a robot arm includes: a communication interface configured to communicate with a distance sensor and an image sensor mounted on the robot arm; and a processor configured to move the robot arm to a position for self-diagnosis and output a malfunction of the robot arm in response to a distance, from a part of the robot arm to a predetermined location around the robot arm, measured by the distance sensor being outside a distance error range, and at least one of a plurality of image measurement values of an image obtained by the image sensor being outside at least one of a plurality of image error ranges, respectively.

The processor may be further configured to output a signal indicating a malfunction of the distance sensor in response to the measured distance being outside the distance error range, and all of the image measurement values of the obtained image being within the image error ranges, respectively, and output a malfunction of the image sensor in response to the measured distance being within the distance error range and at least one of the image measurement values of the obtained image being outside at least one of the image error ranges, respectively.

The processor may be further configured to set an initial distance measured by the distance sensor at the position for the self-diagnosis as a reference distance, wherein the distance error range is an error range of the reference distance.

The processor may be further configured to set at least one of an optimal resolution and an optimal sharpness of the image obtained by the image sensor at the position for the self-diagnosis as a reference image measurement value, wherein the image error range is an error range of the reference image measurement value.

According to one or more exemplary embodiments, there is provided a method of controlling a robot arm which may include: moving the robot arm to a position for self-diagnosis, by using a processor; measuring a distance from a predetermined part of the robot arm to a calibration board, by using a distance sensor mounted on the robot arm; determining whether the measured distance is outside a distance error range, by using the processor; in response to the measured distance being outside the distance error range, obtaining an image of the calibration board, by using an image sensor mounted on the robot arm; determining whether an image measurement value of the obtained image is outside an image error range, by using the processor; and in response to the image measurement value of the obtained image being outside the image error range, outputting a signal indicating a malfunction of the robot arm, by using the processor.

The method may further include, in response to the image measurement value of the obtained image being within the image error range, outputting a malfunction of the distance sensor, by using the processor.

The method may further include: in response to the measured distance being within the distance error range, obtaining the image of the calibration board, by using the image sensor; determining whether the image measurement value of the obtained image is outside the image error range, by using the processor; and in response to the image measurement value of the obtained image being outside the image error range, outputting a malfunction of the image sensor, by using the processor.

The method further includes, before the moving the robot arm, setting at least one of a reference distance and a reference image measurement value, by using the processor, wherein the distance error range is an error range of the reference distance, and the image error range is an error range of the reference image measurement value.

The image measurement value may include a resolution, a sharpness, and a central position of the obtained image, and the reference image measurement value may include a reference resolution, a reference sharpness, and a reference central position, wherein the outputting of the malfunction of the robot arm includes: determining whether the image measurement value is substantially the same as the reference image measurement value, by using the processor; in response to the resolution of the obtained image being substantially different from the reference resolution or the sharpness of the obtained image is substantially different from the reference sharpness, outputting a vertical malfunction of the robot arm, by using the processor; in response to the central position of the obtained image being different from the reference central position, outputting a horizontal malfunction of the robot arm, by using the processor; and in response to the resolution, the sharpness, and the central position of the obtained image being respectively substantially the same as the reference resolution, the reference sharpness, and the reference central position, outputting a malfunction of the distance sensor, by using the processor.

When the distance is not measured by the distance sensor, the method may further include outputting a signal indicating a malfunction of the distance sensor, by using the processor.

According to the exemplary embodiments, user convenience may be provided by distinguishably notifying to an user through self-diagnosis whether a robot arm itself has a malfunction or a sensor mounted on the robot arm has a malfunction.

According to the exemplary embodiments, a technology for efficiently and economically controlling a robot arm may be provided by automatically correcting a malfunction of a sensor mounted on the robot arm through self-diagnosis.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
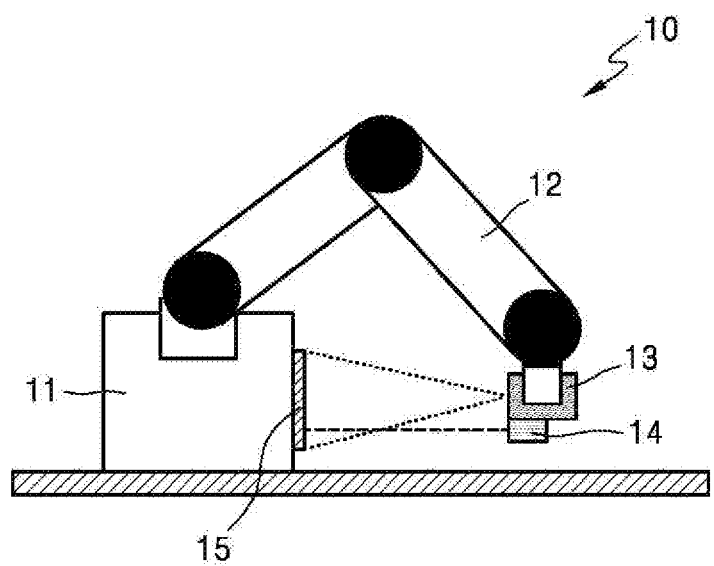
FIGS. 1A and 1B are views for explaining an apparatus for controlling a robot arm according to exemplary embodiments.

As the inventive concept allows for various changes and numerous exemplary embodiments, the exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the exemplary embodiments, certain detailed explanations of the related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe the exemplary embodiments, and are not intended to limit the inventive concept. An expression used in the singular encompasses the expression of the plural, unless it has a clearly different meaning in the context.

In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the present disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing, and/or data processing and the like. The words "mechanism", "element", "means", and "configuration" are used broadly and are not limited to mechanical or physical embodiments, but can include software routines in conjunction with processors, etc.

As used herein, the term "and/or" includes any and all combinations of one or more of the associated listed items. Expressions such as "at least one from among" when preceding a list of elements, modify the entire list of elements and do not modify the individual elements of the list.

The inventive concept will now be described more fully with reference to the accompanying drawings, in which the exemplary embodiments are shown.

Figure 1B:
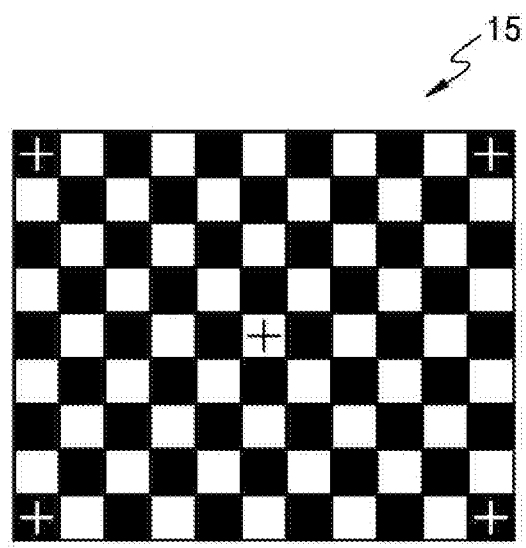

FIGS. 1A and 1B are views for explaining an apparatus for controlling a robot arm 12 according to an exemplary embodiment.

Figure 2:
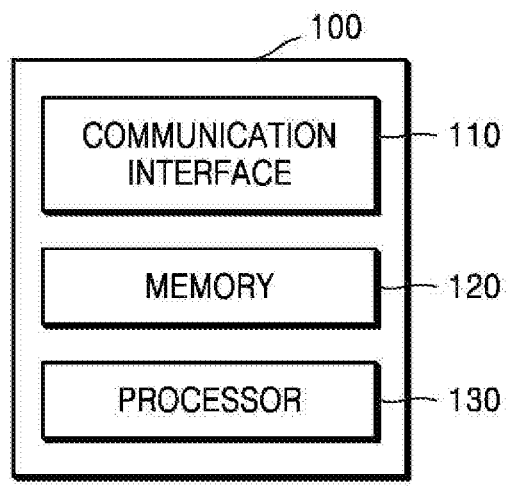
FIG. 2 is a block diagram illustrating a configuration of an apparatus for controlling the robot arm according to an exemplary embodiment.

Referring to FIGS. 1A and 1B, the apparatus according to an exemplary embodiment may include a robot 10 including a base 11, the robot arm 12, an image sensor 13, a distance sensor 14, a calibration board 15, and a processor 130 (see FIG. 2).

The base 11 supports a load of the robot arm 12 and maintains the stability of the robot 10 when the robot arm 12 moves.

The robot arm 12 performs a pick-and-place function by making a linear motion and a rotary motion. The robot arm 12 may include a plurality of joints. Each of the joints may include an actuator.

The image sensor 13 obtains an image. Examples of the image sensor 13 may include a charge-coupled device (CCD) and a complementary metal-oxide semiconductor (CMOS).

The image sensor 13 may be mounted on the robot arm 12. For example, the image sensor 13 may be mounted on an end of the robot arm 12 along with a pick-and-place module.

The distance sensor 14 measures a distance. The distance sensor 14 may measure a distance to the calibration board 15.

The distance sensor 14 may be mounted on the robot arm 12. For example, the distance sensor 14 may be mounted on the end of the robot arm 12. In this case, the distance sensor 14 may be mounted on the end of the robot arm 12 along with the image sensor 13.

The distance sensor 14 may be provided in the image sensor 13.

Calibration marks for self-diagnosis may be shown on a top surface of the calibration board 15 facing the image sensor 13 and the distance sensor 14. A central position of the calibration board 15 may be displayed to be different from other positions. A peripheral position of the calibration board 15 may be displayed to be different from other positions.

The calibration board 15 may be mounted on the base 11. For example, the calibration board 15 may be mounted on a side surface of the base 11.

The calibration board 15 may be mounted on a surface parallel to a top surface of the base 11. For example, the calibration board 15 may be mounted on a top surface of a table on which the robot 10 is mounted.

The processor 130 included in the robot 10 moves the robot arm 12 to a position for self-diagnosis, measures a distance to the calibration board 15 by using the distance sensor 14, obtains an image of the calibration board 15 by using the image sensor 13, and outputs a signal indicating a malfunction of the robot arm 12 when the measured distance is outside a distance error range and at least one of image measurement values of the obtained image is outside an image error range. Here, the distance measured by the processor 130 may be a shortest distance from a predetermined part of the robot arm 12, e.g., a shortest distance from one end of the robot arm 12 to the top surface of the calibration board 15.

The apparatus according to the present exemplary embodiment may provide user convenience and reduce related costs by notifying a malfunction of the robot arm 12 itself, different from a malfunction of the distance sensor 14 or the image sensor 13, to a user.

The processor 130 may obtain an image of the calibration board 15 by using the image sensor 13 when the distance measured by the distance sensor 14 is outside the distance error range.

The processor 130 may move the robot arm 12 to the position for self-diagnosis when the robot 10 is initially driven. The processor 130 may move the robot arm 12 to the position for self-diagnosis at a predetermined time according to a user input. The processor 130 may move the robot arm 12 to the position for self-diagnosis with predetermined time intervals. The processor 130 may move the robot arm 12 to the position for self-diagnosis when the robot 10 is booted, started or initialized.

The position for self-diagnosis may be previously set. For example, the position for self-diagnosis may be a position of the robot arm 12 where the entire top surface of the calibration board 15 mounted on the side surface of the base 11 is imaged by the image sensor 13 mounted on the end of the robot arm 12. Alternatively, the position for self-diagnosis may be a position of the robot arm 12 where a distance to the top surface of the calibration board 15 mounted on the side surface of the base 11 can be measured by the distance sensor 14 mounted on the end of the robot arm 12.

The processor 130 may set at least one of a reference distance and a reference image measurement value. The distance error range may be an error range of the reference distance, and the image error range may be an error range of the reference image measurement value.

The reference distance, the error range of the reference distance, the reference image measurement value, and the error range of the reference image measurement value may be previously set according to a user input.

The processor 130 may previously set an initial distance measured by the distance sensor 14, that is, a firstly measured distance, at the position for self-diagnosis as the reference distance. The initial distance measured by the distance sensor 14 may be an initial distance to the calibration board 15. Here, the initial distance may be a firstly measured shortest distance from the distance sensor to the calibration board 15.

The error range of the reference distance may vary according to a specification of the distance sensor 14.

The reference image measurement value may include a reference resolution, a reference sharpness, and a reference central position.

The processor 130 may set an initial resolution or an optimal resolution of an image obtained by the image sensor 13 at the position for self-diagnosis as the reference resolution. The initial resolution may be a resolution firstly obtained by the processor 130.

An error range of the reference resolution may vary according to a specification of the image sensor 13. For example, the error range of the reference resolution may vary according to a lens specification such as a lens magnification or a lens focal depth of the image sensor 13. The error range of the reference resolution may be determined based on an experimental value of the image sensor 13 having a predetermined specification.

The processor 130 may set an initial sharpness or an optimal sharpness of the image obtained by the image sensor 13 at the position for self-diagnosis as the reference sharpness. The initial sharpness may be a sharpness firstly obtained by the processor 130.

An error range of the reference sharpness may vary according to a specification of the image sensor 13. For example, the error range of the reference sharpness may vary according to the lens specification such as the lens magnification or the lens focal depth. The error range of the reference sharpness may be determined based on an experimental value of the image sensor 13 having the predetermined specification.

The processor 130 may set an initial central position of the image obtained by the image sensor 13 at the position for self-diagnosis as the reference central position. The initial central position may be a central position firstly obtained by the processor 130.

The processor 130 may set a central position of the calibration board 15 as the reference central position.

An error range of the reference central position may vary according to the specification of the image sensor 13. For example, the error range of the reference central position may vary according to the lens specification such as the lens magnification or the lens focal depth of the image sensor 13. The error range of the reference central position may be determined based on an experimental value of the image sensor 13 having the predetermined specification. The error range of the reference central position may vary according to an interval between the calibration marks shown on the calibration board 15.

The image measurement value may include at least one of a resolution, a sharpness, and a central position of the image obtained by the image sensor 13. The processor 130 may output a signal indicating a vertical malfunction of the robot arm 12 when at least one of the resolution and the sharpness of the obtained image is substantially different from the reference image measurement value, and output a signal indicating a horizontal malfunction of the robot arm 12 when the central position of the obtained image is substantially different from the reference image measurement value.

For example, the processor 130 may output the signal indicating the vertical malfunction of the robot arm 12 when the resolution of the obtained image is substantially different from the initial resolution or the optimal resolution that is previously determined or the sharpness of the obtained image is substantially different from the initial sharpness or the optimal sharpness that is previously determined. The processor 130 may output the signal indicating the horizontal malfunction of the robot arm 12 when the central position of the obtained image is substantially different from the initial central position or the central position of the calibration board 15. Here, the expressions "being substantially different" and "being substantially the same" may represent "being outside a corresponding error range" and "being within a corresponding error range" throughout the present disclosure.

The processor 130 may output a signal indicating a malfunction of the distance sensor 14 when the distance measured by the distance sensor 14 is outside the distance error range, and the image measurement value of the image obtained by the image sensor 13 is within the image error range.

The apparatus according to the present exemplary embodiment may provide user convenience and reduce related costs by notifying the malfunction of the distance sensor 14, different from a malfunction of the robot arm 12 itself, to a user.

The processor 130 may output a signal indicating a malfunction of the image sensor 13 when the distance measured by the distance sensor 14 is within the distance error range, and the image measurement value of the image obtained by the image sensor is outside the image error range. Specifically, the processor 130 may output the signal indicating the malfunction of the image sensor 13 when the distance measured by the distance sensor 14 is within the distance error range, and at least one of image measurement values, that is, a resolution, a sharpness and a central position of the image obtained by the image sensor is outside at least one of the image error ranges, that is the error range of the reference resolution, the error range of the reference sharpness and the error range of the reference central position, respectively.

The processor 130 may obtain an image of the calibration board 15 by using the image sensor 13 when the distance measured by the distance sensor 14 is within the distance error range.

The apparatus according to the present exemplary embodiment may provide user convenience and reduce related costs by notifying the malfunction of the image sensor 13, different from a malfunction of the robot arm 12 itself, to a user.

The processor 130 may output a signal indicating a malfunction of the distance sensor 14 when the distance to the calibration board 15 cannot be measured by using the distance sensor 14 at the position for self-diagnosis of the robot arm 12 that is previously set.

The processor 130 may correct the malfunction of the distance sensor 14.

In detail, the processor 130 may correct the malfunction of the distance sensor 14 when the malfunction of the distance sensor 14 can be corrected, and may output the signal indicating the malfunction of the distance sensor 14 when the malfunction of the distance sensor 14 cannot be corrected.

A case where the malfunction of the distance sensor 14 can be corrected is, for example, a case where the distance to the calibration board 15 can be measured by using the distance sensor 14 at the position for self-diagnosis of the robot arm 12 that is previously set. Accordingly, the processor 130 may correct the malfunction of the distance sensor 14 when the distance to the calibration board 15 can be measured by using the distance sensor 14.

A case where the malfunction of the distance sensor 14 can be corrected is, for example, a case where the distance measured by the distance sensor 14 is outside the distance error range. Accordingly, the processor 130 may correct the malfunction of the distance sensor 14 when the distance measured by the distance sensor 14 is outside the distance error range.

A case where the malfunction of the distance sensor 14 cannot be corrected is, for example, a case where the distance to the calibration board 15 cannot be measured by using the distance sensor 14. Accordingly, the processor 130 may output a signal indicating the malfunction of the distance sensor 14 when the distance to the calibration board 15 cannot be measured by using the distance sensor 14.

The apparatus according to the present exemplary embodiment may provide a technology for efficiently and economically controlling the robot arm 12 by automatically correcting a malfunction of a sensor mounted on the robot arm 12 through self-diagnosis.

The processor 130 may optimize a function of the image sensor 13 when the distance measured by the distance sensor 14 is within the distance error range and all of the image measurement values of the image obtained by the image sensor 13 are within all of the image error ranges, respectively, and may move the robot arm 12 from the position for self-diagnosis to a position for performing a pick-and-place function. The optimization of the function of the image sensor 13 will be explained below with reference to FIG. 7.

Here, the various signals indicating a malfunction of the robot arm 12, the image sensor 13, the distance sensor 14 may be expressed by different forms to distinguish one from the others. These signals may be one of a visual signal, an audio signal, a haptic signal, etc., not being limited thereto, or a combination of these signals.

The same description as that made in the above will be briefly given or omitted.

FIG. 2 is a block diagram illustrating a configuration of an apparatus 100 for controlling the robot arm 12 according to an exemplary embodiment.

Referring to FIG. 2, the apparatus 100 according to an exemplary embodiment includes a communication interface 110, a memory 120, and the processor 130.

The apparatus 100 may be separate from the robot 10 (see FIG. 1A) and may communicate with the robot 10. The apparatus 100 may perform a control operation related to a process of outputting a malfunction of at least one of the robot arm 12 (see FIG. 1A), the image sensor 13 (see FIG. 1A), and the distance sensor 14 (see FIG. 1A). The apparatus 100 may perform a control operation related to a process of correcting at least one of the image sensor 13 and the distance sensor 14.

The communication interface 110 communicates with the distance sensor 14 and the image sensor 13 mounted on the robot arm 12.

The communication interface 110 may receive distance data from the distance sensor 14.

The communication interface 110 may receive image data from the image sensor 13.

The communication interface 110 may receive a user input. The user input may include an input related to at least one of a time at which the robot arm 12 moves to a position for self-diagnosis, a reference distance, an error range of the reference distance, a reference image measurement value (i.e., a reference resolution, a reference sharpness, and a reference central position), and an error range of the reference image measurement value.

The memory 120 may store information received through the communication interface 110 and information generated by the processor 130.

The memory 120 may store the distance data received from the distance sensor 14, the image data received from the image sensor 13, and the user input.

The memory 120 may store a position for self-diagnosis of the robot arm 12, a time at which the robot arm 12 moves to the position for self-diagnosis, a specification of the image sensor 13, a specification of the distance sensor 14, a reference distance, an error range of the reference distance, a reference image measurement value, an error range of the reference image measurement value, a measured distance, and an image measurement value.

The processor 130 moves the robot arm 12 to the position for self-diagnosis, and outputs a signal indicating a malfunction of the robot arm 12 when the distance measured by the distance sensor 14 at the position for self-diagnosis is outside a distance error range and at least one of the image measurement values of the image obtained by the image sensor 13 is outside at least one of the image error ranges, respectively.

The processor 130 may output a signal indicating a malfunction of the distance sensor 14 when the distance measured by the distance sensor 14 is outside the distance error range, and all of the image measurement values of the image obtained by the image sensor 13 is within all of the image error ranges, respectively, and may output a signal indicating a malfunction of the image sensor 13 when the distance measured by the distance sensor 14 is within the distance error range, and at least one of the image measurement values of the image obtained by the image sensor 13 is outside at least one of the image error ranges, respectively.

The processor 130 may set an initial distance measured by the distance sensor 14 at the position for self-diagnosis as the reference distance, and the distance error range may be an error range of the reference distance.

The processor 130 may set at least one of an optimal resolution and an optimal sharpness of the image obtained by the image sensor 13 at the position for self-diagnosis as the reference image measurement value, and the image error range may be an error range of the reference image measurement value.

Figure 3:
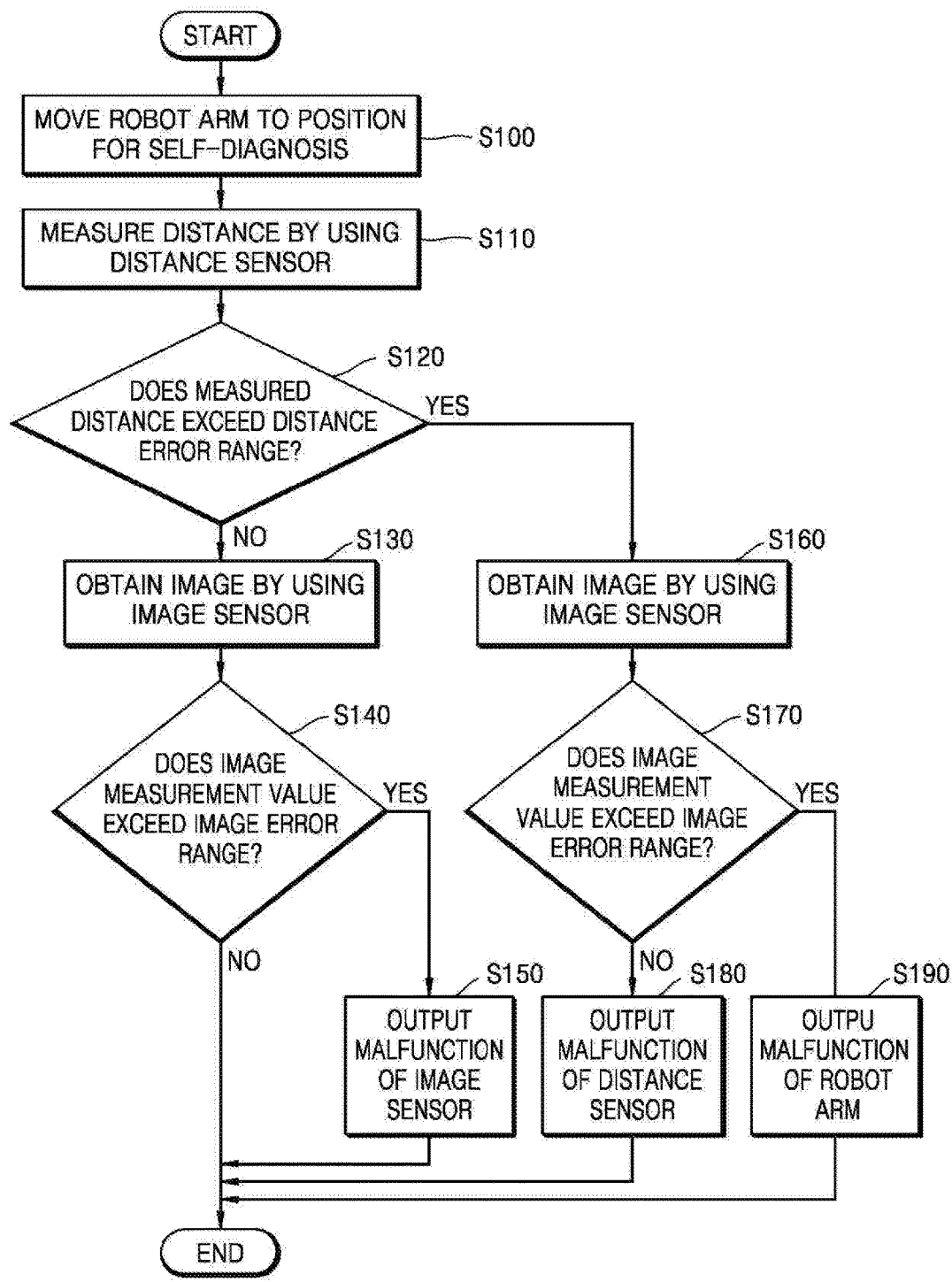
FIG. 3 is a flowchart of a method of controlling the robot arm according to an exemplary embodiment.

FIG. 3 is a flowchart of a method of controlling the robot arm 12 according to an exemplary embodiment.

Referring to FIG. 3, in operation S100, the processor 130 moves the robot arm 12 to a position for self-diagnosis.

Before operation S100, the processor 130 may set at least one of a reference distance and a reference image measurement value. A distance error range may be an error range of the reference distance, and an image error range may be an error range of the reference image measurement value.

Next, in operation S110, a distance to the calibration board 15 is measured by the distance sensor 14 mounted on the robot arm 12.

In operation S120, the processor 130 determines whether the measured distance is outside the distance error range.

When it is determined in operation S120 that the measured distance is within the distance error range, the method proceeds to operation S130. In operation S130, an image of the calibration board 15 is obtained by the image sensor 13 mounted on the robot arm 12.

Next, in operation S140, it is determined whether an image measurement value of the obtained image is outside the image error range.

When it is determined in operation S140 that the image measurement value of the obtained image is within the image error range, the processor 130 may optimize a function of the image sensor 13, and move the robot arm 12 from the position for self-diagnosis to a position for performing a pick-and-place function.

When it is determined in operation S140 that the image measurement value of the obtained image is outside the image error range, the method proceeds to operation S150. In operation S150, the processor 130 outputs a signal indicating a malfunction of the image sensor 13.

Accordingly, since the malfunction of the image sensor 13, different from a malfunction of the robot arm 12 itself, may be notified to a user who manages the malfunction of the image sensor 13, user convenience may be provided. Also, since unnecessary notification to the user who manages the malfunction of the robot arm 12 itself may be avoided, user convenience may be provided. As a result, costs for operating an apparatus according to the present exemplary embodiment may be reduced.

When it is determined in operation S120 that the measured distance is outside the distance error range, the method proceeds to operation S160. In operation S160, an image of the calibration board 15 is obtained by the image sensor 13.

Next, in operation S170, the processor 130 determines whether an image measurement value of the obtained image is outside the image error range.

When it is determined in operation S170 that the image measurement value of the obtained image is within the image error range, the method proceeds to operation S180. In operation S180, the processor 130 outputs a signal indicating a malfunction of the distance sensor 14.

Accordingly, since the malfunction of the distance sensor 14, different from the malfunction of the robot arm 12 itself, may be notified to a user who manages the malfunction of the distance sensor 14, user convenience may be provided. Also, since unnecessary notification to the user who manages the malfunction of the robot arm 12 itself may be avoided, user convenience may be provided. As a result, costs for operating the apparatus according to the present exemplary embodiment may be reduced.

When it is determined in operation S170 that the image measurement value of the obtained image is outside the image error range, the method proceeds to operation S190. In operation S190, the processor 130 outputs a signal indicating a malfunction of the robot arm 12.

Accordingly, since the malfunction of the robot arm 12, different from a malfunction of a sensor for self-diagnosis, may be notified to a user who manages the malfunction of the robot arm 12, user convenience may be provided. Also, since unnecessary notification to the user who manages the malfunction of the sensor may be avoided, convenience may be provided to the user. As a result, costs for operating the apparatus according to the present exemplary embodiment may be reduced.

Here, the image measurement value may indicate at least one of the resolution, the sharpness and the central position of the image obtained by the image sensor 13.

Figure 4:
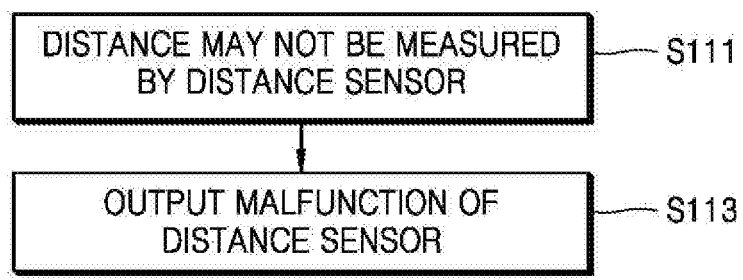
FIG. 4 is a flowchart of a method of outputting a malfunction of a distance sensor according to an exemplary embodiment.

FIG. 4 is a flowchart of a method of outputting a malfunction of the distance sensor 14 according to an exemplary embodiment.

Referring to FIG. 4, when it is determined in operation S111 that a distance to the calibration board 15 cannot be measured by the distance sensor 14, the method proceeds to operation S113. In operation S113, the processor 130 outputs a malfunction of the distance sensor 14.

Figure 5:
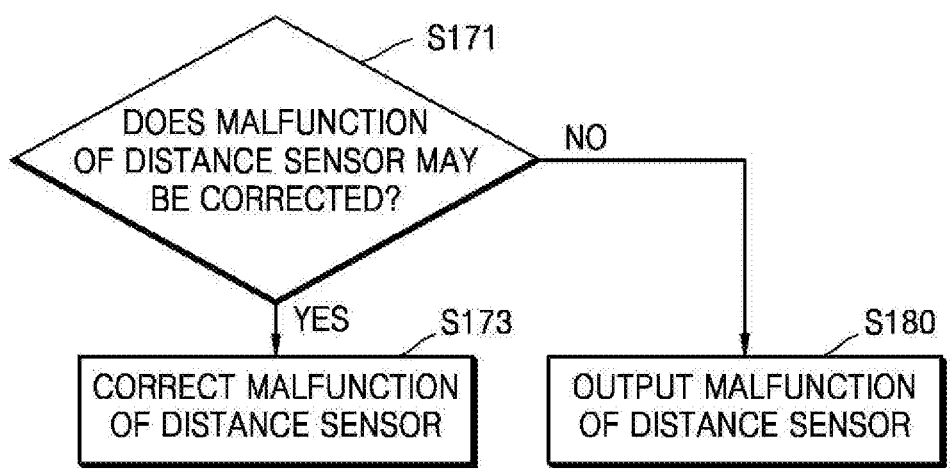
FIG. 5 is a flowchart of a method of correcting a malfunction of the distance sensor according to an exemplary embodiment.

FIG. 5 is a flowchart of a method of correcting a malfunction of the distance sensor 14 according to an exemplary embodiment.

Operations S171 and S173 of FIG. 5 may be performed before operation S180 of FIG. 3.

Operation S180 of FIG. 5 corresponds to operation S180 of FIG. 3.

Referring to FIG. 5, when a malfunction of the distance sensor 14 is detected, in operation S171, the processor 130 determines whether the malfunction of the distance sensor 14 can be corrected.

When it is determined in operation S171 that the malfunction of the distance sensor 14 can be corrected, the method proceeds to operation S173. In operation S173, the processor 130 corrects the malfunction of the distance sensor 14. A case where the malfunction of the distance sensor 14 can be corrected is, for example, a case where a distance to the calibration board 15 can be measured by the distance sensor 14.

When it is determined in operation S171 that the malfunction of the distance sensor 14 cannot be corrected, the method proceeds to operation S180. In operation S180, the processor 130 outputs a signal indicating the malfunction of the distance sensor 14. A case where the malfunction of the distance sensor 14 cannot be corrected is, for example, a case where the distance to the calibration board 15 cannot be measured by the distance sensor 14.

As such, since a malfunction of the distance sensor 14 mounted on the robot arm 12 may be automatically corrected by performing self-diagnosis, a technology for more efficiently and economically controlling the robot arm 12 may be provided.

Figure 6:
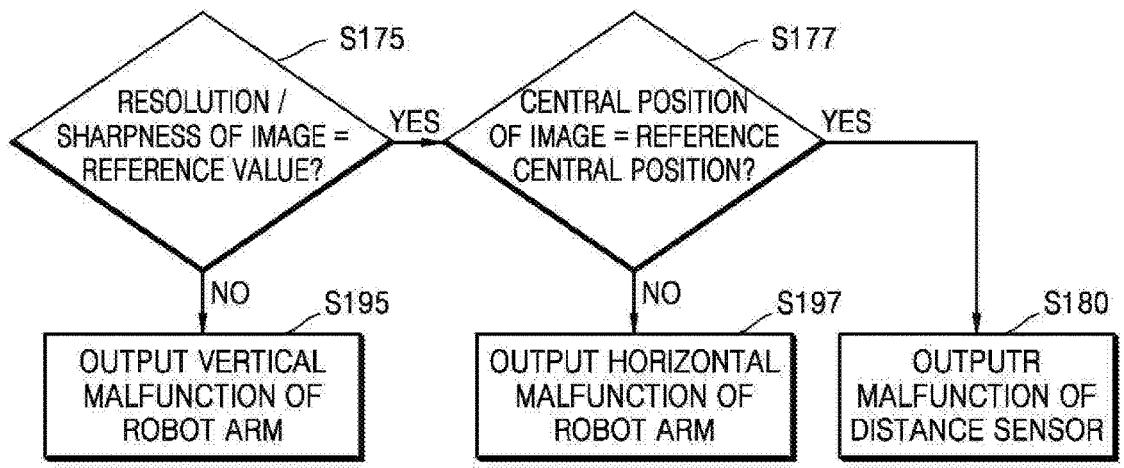
FIG. 6 is a flowchart of a method of outputting a malfunction of the robot arm according to an exemplary embodiment.

FIG. 6 is a flowchart of a method of outputting a malfunction of the robot arm 12 according to an exemplary embodiment.

Operations S175 and S177 of FIG. 6 are included in operation S170 of FIG. 3.

Operation S180 of FIG. 6 corresponds to operation S180 of FIG. 3.

Operations S195 and S197 of FIG. 6 are included in operation S190 of FIG. 3.

Referring to FIG. 6, an image measurement value may include a resolution, a sharpness, and a central position of an obtained image. A reference image measurement value may include a reference resolution, a reference sharpness, and a reference central position.

In operation S175, the processor 130 determines whether the resolution and the sharpness of the obtained image are respectively substantially the same as the reference resolution and the reference sharpness.

When it is determined in operation S175 that the resolution of the obtained image is substantially different from the reference resolution or the sharpness of the obtained image is substantially different from the reference sharpness, the method proceeds to operation S195. In operation 195, the processor 130 outputs a vertical malfunction of the robot arm 12.

When it is determined in operation S175 that the resolution and the sharpness of the obtained image are respectively substantially the same as the reference resolution and the reference sharpness, the method proceeds to operation S177. In operation S177, the processor 130 determines whether the central position of the obtained image is substantially the same as the reference central position. Although not shown in FIG. 6, even when the resolution of the obtained image is substantially different from the reference resolution or the sharpness of the obtained image is substantially different from the reference sharpness, the processor 130 may determine whether the central position of the obtained image is substantially the same as the reference central position.

When it is determined in operation S177 that the central position of the obtained image is substantially different from the reference central position, the method proceeds to operation S197. In operation S197, the processor 130 outputs a horizontal malfunction of the robot arm 12.

When it is determined in operation S177 that the central position of the obtained image is substantially the same as the reference central position, the method proceeds to operation S180. In operation S180, the processor 130 outputs a malfunction of the distance sensor 14.

Figure 7:
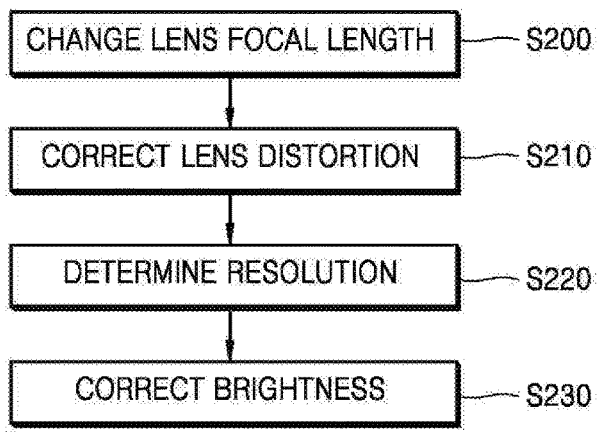
FIG. 7 is a flowchart of a method of optimizing an image sensor mounted on the robot arm according to an exemplary embodiment.

FIG. 7 is a flowchart of a method of optimizing the image sensor 13 mounted on the robot arm 12 according to an embodiment.

Referring to FIG. 7, after operation S140 of FIG. 3, when an image measurement value of an obtained image is within an image error range, the processor 130 may optimize a function of the image sensor 13.

In operation S200, the processor 130 changes a lens focal length of the image sensor 13.

In order to perform operation S200, the processor 130 may change the lens focal length of the image sensor 13 based on a reference sharpness when a sharpness of the image obtained by image sensor 13 is substantially different from the reference sharpness. When a lens of the image sensor 13 is a motorized lens, the processor 130 may automatically change the lens focal length of the image sensor 13. When the lens of the image sensor 13 is a manual lens, the processor 130 may output a signal notifying a lens focal length change of the image sensor 13.

When it is determined that the sharpness of the image obtained by the image sensor 13 is substantially the same as the reference sharpness, or the lens focal length of the image sensor 13 is changed based on the reference sharpness, the method proceeds to operation S210. In operation S210, the processor 130 corrects lens distortion.

The processor 130 may correct the lens distortion by using specific parameters such as an intrinsic matrix and a distortion vector of the lens of the image sensor 13.

Next, in operation S220, the processor 130 determines a resolution of the image sensor 13.

For example, the processor 130 may measure the resolution of the image sensor 13 by using intersections of the calibration board 15 included in the image obtained by the image sensor 13.

Next, in operation S230, the processor 130 corrects a brightness of the image sensor 13.

For example, the processor 130 may correct the brightness of the image sensor 13 by adjusting an exposure time or a gain of the image sensor 13.

When an optimization of function of the image sensor 13 is completed, the processor 130 may move the robot arm 12 from a position for self-diagnosis to a position for performing a pick-and-place function.

As such, since the image sensor 13 is corrected by using the calibration board 15, a technology for more efficiently and economically controlling the robot arm 12 may be provided.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by one of ordinary skill in the art that various changes in form and details may be made therein without departing from the spirit and scope of the inventive concept as defined by the following claims.

What is claimed is:

1. An apparatus for controlling a robot arm, the apparatus comprising:
   a calibration board on which calibration marks for self-diagnosis are shown;
   a distance sensor mounted on the robot arm;
   an image sensor mounted on the robot arm; and
   a processor configured to control the robot arm to move a position for the self-diagnosis, obtain a distance, measured by the distance sensor, from a predetermined part of the robot arm to the calibration board, obtain an image of the calibration board taken by the image sensor, and output a signal indicating a malfunction of the robot arm in response to the distance, measured by the distance sensor, being outside a distance error range, and an image measurement value of the obtained image being outside an image error range,
   wherein the processor is further configured to output a signal indicating a malfunction of the distance sensor in response to the measured distance being outside the distance error range, and the image measurement value of the obtained image being within the image error range.

2. The apparatus of claim 1, wherein the processor is further configured to correct the malfunction of the distance sensor.

3. The apparatus of claim 1, wherein the processor is further configured to set at least one of a reference distance and a reference image measurement value, and
   wherein the distance error range comprises an error range of the reference distance, and the image error range comprises an error range of the reference image measurement value.

4. The apparatus of claim 3, wherein the image measurement value comprises at least one of a resolution, a sharpness, and a central position of the obtained image, and
   wherein the processor is further configured to output a signal indicating a vertical malfunction of the robot arm in response to at least one of the resolution and the sharpness of the obtained image is substantially different from the reference image measurement value, and output a signal indicating a horizontal malfunction of the robot arm in response to the central position of the obtained image is substantially different from the reference image measurement value.

5. The apparatus of claim 3, wherein the image measurement value comprises at least one of a resolution, a sharpness, and a central position of the obtained image, and the reference image measurement value comprises at least one of a reference resolution, a reference sharpness, and a reference central position, and
   wherein the processor is further configured to output a signal indicating a vertical malfunction of the robot arm in response to at least one of the resolution and the sharpness of the obtained image being outside at least one of an error range of the reference resolution and an error range of the reference sharpness, respectively, and output a signal indicating a horizontal malfunction of the robot arm in response to the central position of the obtained image being outside an error range of the reference central position.

6. The apparatus of claim 1, wherein the processor is further configured to output a signal indicating a malfunction of the distance sensor in response to the distance from the predetermined part of the robot arm to the calibration board not being measured by using the distance sensor.

7. An apparatus for controlling a robot arm, the apparatus comprising:
   a calibration board on which calibration marks for self-diagnosis are shown;
   a distance sensor mounted on the robot arm;
   an image sensor mounted on the robot arm; and
   a processor to control the robot arm to move a position for the self-diagnosis, obtain a distance, measured by the distance sensor, from a predetermined part of the robot arm to the calibration board, obtain an image of the calibration board taken by the image sensor, and output a signal indicating a malfunction of the robot arm in response to the distance measured by the distance sensor being outside a distance error range, and an image measurement value of the obtained image being within an image error range, wherein the processor is further configured to output a signal indicating a malfunction of the image sensor in response to the measured distance being within the distance error range, and the image measurement value of the obtained image being outside the image error range.

8. An apparatus for controlling a robot arm, the apparatus comprising:
a communication interface configured to communicate with a distance sensor and an image sensor mounted on the robot arm; and
a processor configured to move the robot arm to a position for self-diagnosis and output a signal indicating a malfunction of the robot arm in response to a distance, from a part of the robot arm to a predetermined location around the robot arm, measured by the distance sensor being outside a distance error range, and at least one of a plurality of image measurement values of an image obtained by the image sensor being outside at least one of a plurality of image error ranges, respectively,
wherein the processor is further configured to output a signal indicating a malfunction of the distance sensor in response to the measured distance being outside the distance error range, and all of the image measurement values of the obtained being within the image error ranges, respectively, and output a signal indicating a malfunction of the image sensor in response to the measured distance being within the distance error range and at least one of the image measurement values of the obtained image being outside at least one of the image error ranges, respectively.

9. The apparatus of claim 8, wherein the part of the robot arm is one end of the robot arm used to pick and place an object, and the predetermined location is a calibration point provided at a support of the robot arm.

10. The apparatus of claim 8, wherein the image measurement values comprise a resolution, a sharpness, and a central position of the image, and the image error ranges comprise an error range of a reference resolution, an error range of a reference sharpness, and an error range of a reference central position.

11. The apparatus of claim 8, wherein the processor is further configured to set an initial distance measured by the distance sensor at the position for the self-diagnosis as a reference distance, and
wherein the distance error range is an error range of the reference distance.

12. The apparatus of claim 8, wherein the processor is further configured to set at least one of an optimal resolution and an optimal sharpness of the image obtained by the image sensor at the position for the self-diagnosis as a reference image measurement value, and
wherein the image error range is an error range of the reference image measurement value.

13. A method of controlling a robot arm, the method comprising:
controlling, by a processor, to move the robot arm to a positon for self-diagnosis;
measuring, by a distance sensor mounted on the robot arm, a distance from a predetermined part of the robot arm to a calibration board;
determining, by the processor, whether the measured distance is outside a distance error range;
in response to the measured distance being outside the distance error range, obtaining, by an image sensor mounted on the robot arm, an image of the calibration board;
determining, by the processor, whether an image measurement value of the obtained image is outside an image error range;
in response to the image measurement value of the obtained image being outside the image error range, outputting, by the processor, a signal indicating a malfunction of the robot arm;
in response to the measured distance being within the distance error range, obtaining, by the image sensor, the image of the calibration board;
determining, by the processor, whether the image measurement value of the obtained image is outside the image error ranges; and
in response to the image measurement value of the obtained image being outside the image error range, outputting, by the processor, a signal indicating a malfunction of the image sensor.

14. The method of claim 13, further comprising, in response to the image measurement value of the obtained image being within the image error range, outputting, by the processor, a signal indicating a malfunction of the distance sensor.

15. The method of claim 13, wherein the method further comprises, before the moving the robot arm, setting, by the processor, at least one of a reference distance and a reference image measurement value, and
wherein the distance error range is an error range of the reference distance, and the image error range is an error range of the reference image measurement value.

16. The method of claim 15, wherein the image measurement value comprises a resolution, a sharpness, and a central position of the obtained image,
wherein the reference image measurement value comprises a reference resolution, a reference sharpness, and a reference central position,
wherein the outputting the signal indicating the malfunction of the robot arm comprises:
determining, by the processor, whether the image measurement value is substantially the same as the reference image measurement value;
in response to the resolution of the obtained image being substantially different from the reference resolution or the sharpness of the obtained image is substantially different from the reference sharpness, outputting, by the processor, a signal indicating a vertical malfunction of the robot arm;
in response to the central position of the obtained image being different from the reference central position, outputting, by the processor, a signal indicating a horizontal malfunction of the robot arm; and
in response to the resolution, the sharpness, and the central position of the obtained image being respectively substantially the same as the reference resolution, the reference sharpness, and the reference central position, outputting, by the processor, a signal indicating a malfunction of the distance sensor.

17. The method of claim 13, wherein the method further comprises, in response to the distance not being measured by the distance sensor, outputting, by the controller, a signal indicating a malfunction of the distance sensor.

* * * * *